US012580714B2

(12) United States Patent
　　　Qiao et al.

(10) Patent No.:　US 12,580,714 B2
(45) Date of Patent:　　Mar. 17, 2026

(54) METHOD AND APPARATUS FOR DETERMINING SEARCH SPACE

(71) Applicant: Beijing Xiaomi Mobile Software Co., Ltd., Beijing (CN)

(72) Inventors: Xuemei Qiao, Beijing (CN); Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 358 days.

(21) Appl. No.: 18/039,902

(22) PCT Filed: Dec. 3, 2020

(86) PCT No.: PCT/CN2020/133660
　　§ 371 (c)(1),
　　(2) Date: Jun. 1, 2023

(87) PCT Pub. No.: WO2022/116097
　　PCT Pub. Date: Jun. 9, 2022

(65) Prior Publication Data
　　US 2024/0097864 A1　　Mar. 21, 2024

(51) Int. Cl.
　　*H04L 5/00*　　　　(2006.01)
　　*H04W 52/02*　　　(2009.01)
(52) U.S. Cl.
　　CPC ....... *H04L 5/0092* (2013.01); *H04W 52/0212* (2013.01); *H04L 5/0053* (2013.01)
(58) Field of Classification Search
　　CPC ..... H04L 5/0092; H04L 5/0053; H04L 5/001; H04W 52/0212; Y02D 30/70
　　See application file for complete search history.

(56) References Cited

U.S. PATENT DOCUMENTS

| | | | | |
|---|---|---|---|---|
| 2018/0139024 A1* | 5/2018 | Shi | ........................... | H04W 4/70 |
| 2019/0313321 A1* | 10/2019 | Xu | ........................ | H04W 72/51 |
| 2020/0007295 A1* | 1/2020 | Kwak | .................. | H04L 5/0053 |
| 2020/0374722 A1* | 11/2020 | Takeda | ................. | H04W 24/08 |
| 2023/0069404 A1* | 3/2023 | Kittichokechai | ..... | H04L 5/0096 |
| 2023/0180251 A1* | 6/2023 | Zhou | .................... | H04W 48/16 |
| | | | | 370/329 |

FOREIGN PATENT DOCUMENTS

| | | |
|---|---|---|
| CN | 109787710 A | 5/2019 |
| CN | 111052661 A | 4/2020 |

(Continued)

OTHER PUBLICATIONS

CATT. "Discussion on PDCCH monitoring reduction" 3GPP TSG RAN WG1 Meeting #103-e R1-2007863, Nov. 13, 2020 (Nov. 13, 2020), section 2; Type-X (Year: 2020).*

(Continued)

*Primary Examiner* — Chae S Lee

(74) *Attorney, Agent, or Firm* — Volpe Koenig

(57) ABSTRACT

A method, computer readable medium, and apparatus for determining a search space to improve power consumption of device in a wireless network, The power consumption is improved by: determining a maximum number of candidate channel for each AL in a USS, where the maximum number of candidate channel for at least one AL is less than a maximum configuration value.

20 Claims, 1 Drawing Sheet

Determine a maximum number of candidate channels for each AL in a USS, where the maximum number of candidate channels for at least one AL is less than a maximum configured value

⌐101

(56) References Cited

FOREIGN PATENT DOCUMENTS

| | | |
|---|---|---|
| CN | 111769930 A | 10/2020 |
| WO | 2017/050197 A1 | 3/2017 |

OTHER PUBLICATIONS

"3GPP TR 21.915" Release 15 Description, Sep. 2019 (Sep. 2019), entire document; Type-A.

"3GPP TR 21.916" Release 16 Description, Sep. 2020 (Sep. 2020), entire document; Type-A.

CATT. "Discussion on PDCCH monitoring reduction" 3GPP TSG RAN WG1 Meeting #103-e R1-2007863, Nov. 13, 2020 (Nov. 13, 2020), section 2; Type-X.

Xiaomi. "Discussion on reduced PDCCH monitoring for reduced capability devices" 3GPP TSG RAN WG1 #103-e R1-2008085, Nov. 13, 2020 (Nov. 13, 2020), sections 1-2; Type-X.

Wilus Inc. "Discussion on PDCCH monitoring for RedCap UE" 3GPP TSG RAN WG1 #103-e R1-2008727, Nov. 13, 2020 (Nov. 13, 2020), sections 1-2; Type-X.

Apple Inc. "Feature lead summary #8 on reduced PDCCH monitoring" 3GPP TSG-RAN WG1 #103-e R1-2009766, Nov. 13, 2020 (Nov. 13, 2020), section 8.2; Type-X.

Fraunhofer Hhi et al. "Reduced PDCCH Monitoring for RedCap UEs" 3GPP TSG RAN WG1 Meeting #103-e R1-2008712, Nov. 13, 2020 (Nov. 13, 2020), sections 1-2; Type-X.

* cited by examiner

Determine a maximum number of candidate channels for each AL in a USS, where the maximum number of candidate channels for at least one AL is less than a maximum configured value ⌐101
Fig. 1
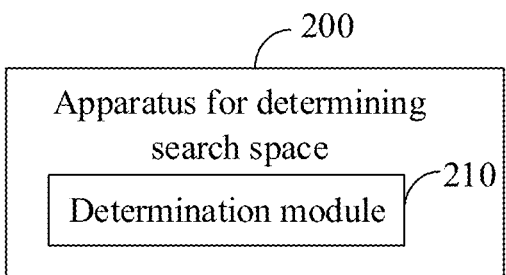
⌐200
Apparatus for determining search space
Determination module ⌐210
Fig. 2
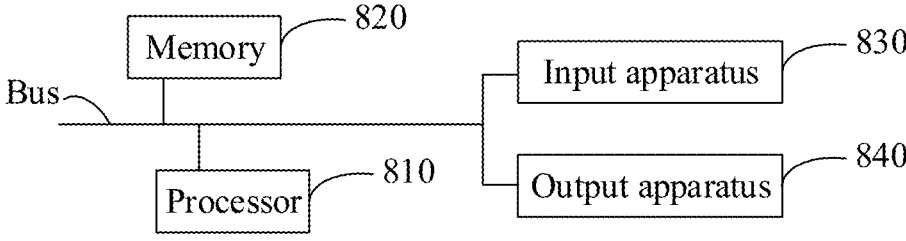
Fig. 3

METHOD AND APPARATUS FOR DETERMINING SEARCH SPACE

CROSS REFERENCE TO RELATED APPLICATION

The present application is a U.S. National Stage of International Application No. PCT/CN2020/133660, filed on Dec. 3, 2020, the contents of all of which are incorporated herein by reference in their entirety for all purposes

BACKGROUND

As the Internet of Things services develop, video surveillance, smart home, wearable devices, industrial sensing monitoring, and the like, have been popularized, which usually have a large transmission rate and a relatively high requirement for delay.

SUMMARY

In a first aspect, a method for determining a search space is provided in an example of the disclosure. The method includes:
determining a maximum number of candidate channels for each aggregation level (AL) in a user equipment (UE)-specific search space (USS), where the maximum number of candidate channels for at least one AL is less than a maximum configured value.

In a second aspect, a communication device is provided in an example of the disclosure. The communication device includes: a transceiver; a memory; and a processor, which is connected to the transceiver and the memory separately and configured to control the transceiver to receive and transmit a radio signal by executing a computer-executable instruction in the memory, and may implement the above method for determining a search space.

In a third aspect, a non-transitory computer storage medium is provided in an example of the disclosure. The non-transitory computer storage medium stores a computer-executable instruction, where the computer-executable instruction may implement the above method for determining a search space when executed by a processor.

Some additional aspects and advantages of the disclosure will be set forth in the following description, and other additional aspects and advantages will be apparent from the following description, or learned by practice of the disclosure.

BRIEF DESCRIPTION OF THE DRAWINGS

The above and/or additional aspects and advantages of the disclosure will become apparent and readily appreciated from the following description of examples in conjunction with the accompanying drawings. In the figures:

FIG. 1 is a schematic flowchart of a method for determining a search space according to an example of the disclosure;

FIG. 2 is a schematic structural diagram of an apparatus for determining a search space according to an example of the disclosure; and FIG. 3 is a schematic structural diagram of a communication device according to an example of the disclosure.

DETAILED DESCRIPTION

The examples of the disclosure are described in detail below and illustratively shown in the accompanying drawings. The same or similar reference numerals denote the same or similar elements or elements having the same or similar functions throughout. The examples described below with reference to the accompanying drawings are illustrative and intended to explain the disclosure, but should not be interpreted as limiting the disclosure.

Since the relevant machine-type communication, narrowband Internet of Things, and the like, hardly satisfy the requirements for rate and delay in some Internet of Things service scenarios, the technology with a high rate and a low delay may be utilized. Aiming at high-end UEs having a high rate, a low delay, etc., the existing new radio can satisfy the requirements for a high rate and a low delay of an Internet of Things device. However, the Internet of Things device is limited to its use scenario, which typically requires low power consumption. Consequently, the new radio technology cannot satisfy the requirement for saving power in such devices. Accordingly, in the related art, the power consumption of such UEs can be reduced by reducing the maximum number of blind detections of such UEs.

Correspondingly, the disclosure relates to the technical field of mobile communication and provides a method and apparatus for determining a search space. The maximum number of blind detections of a UE is reduced by reducing the maximum numbers of candidate channels for some or all aggregation levels (ALs), so as to save the power of a device.

FIG. 1 is a schematic flowchart of a method for determining a search space according to an example of the disclosure. As shown in FIG. 1, the method for determining a search space includes step 101.

In step 101, a maximum number of candidate channels for each AL in a user equipment (UE)-specific search space (USS) is determined. The maximum number of candidate channels for at least one AL is less than a maximum configured value.

A control channel element (CCE) is a basic unit for forming a control channel. For example, a given physical downlink control channel (PDCCH) may be formed by 1, 2, 4, 8, or 16 CCEs, where the number of CCEs forming the PDCCH is referred to as an AL.

In the example, the maximum number of blind detections of the UE is reduced by controlling the maximum number of candidate channels for the AL in the USS. Consequently, the power consumption of the UE is reduced, and the power is saved.

In the example, a communication device, such as a base station, may determine the maximum number of candidate channels for each AL in the USS by parsing a relevant protocol. The maximum number of candidate channels for at least one AL is less than the maximum configured value. The maximum configured value may be the maximum number of candidate channels supportable by the AL in the USS of each UE specified in the protocol. For example, the maximum configured value specified in the related art is 8.

For example, the maximum configured value specified in the related art is 8, and there are five ALs in the USS, which are AL=1, AL=2, AL=4, AL=8, and AL=16. The maximum numbers of candidate channels for the five ALs are 2, 4, 5, 6, and 8, respectively. It can be seen that the maximum numbers of candidate channels for AL=1, AL=2, AL=4, and AL=8 are less than the maximum configured value of 8.

It is to be noted that in the example, the maximum number of candidate channels for each AL in the USS may be the same or not.

According to the method for determining a search space in the example of the disclosure, the maximum number of candidate channels for at least one AL in the USS is determined to be less than the maximum configured value, so as to reduce the maximum number of blind detections of the UE. Consequently, the power consumption of the UE is reduced, and the power is saved.

In practical applications, downlink coverage capacities of UEs configured with different numbers of receiving antennas vary. In view of that, in an example of the disclosure, the communication device may determine the maximum number of candidate channels for each AL in the USS by parsing the relevant protocol. The maximum number of candidate channels for at least one AL is less than the maximum configured value, and the maximum number of candidate channels for each AL in the USS is relevant to the number of receiving antennas included in the UE. That is, since the numbers of receiving antennas included in the UEs are different, the maximum number of candidate channels for each AL in the USS may vary.

For example, the UE includes one receiving antenna, and the candidate channel for each AL in the USS may be as follows:

```
nrofCandidatesfor1RX
SEQUENCE {
aggregationLevel2      ENUMERATED {n0, n1},
aggregationLevel4      ENUMERATED {n0, n1, n2},
aggregationLevel8      ENUMERATED {n0, n1, n2, n3},
aggregationLevel16     ENUMERATED {n0, n1, n2, n3, n4, n5}
aggregationLevel32     ENUMERATED {n0, n1, n2, n3, n4, n5, n6}
}
```

It can be seen that the UE includes one receiving antenna, and the USS includes five ALs, which are AL=2, AL=4, AL=8, AL=16, and AL=32, respectively. The maximum numbers of candidate channels for the five ALs are 1, 2, 3, 5, and 6, respectively. Further, aggregationLevel2 ENUMERATED {n0, n1} indicates that the numbers of candidate channels supportable by AL=2 are 0 and 1.

For example, the UE includes two receiving antennas, and the number of candidate channels for each AL in the USS may be as follows:

```
nrofCandidatesfor2RX
SEQUENCE {
aggregationLevel1      ENUMERATED {n0, n1},
aggregationLevel2      ENUMERATED {n0, n1, n2},
aggregationLevel4      ENUMERATED {n0, n1, n2, n3},
aggregationLevel8      ENUMERATED {n0, n1, n2, n3},
aggregationLevel16     ENUMERATED {n0, n1, n2, n3, n4, n5}
}
```

It can be seen that the UE includes two receiving antennas, and the USS includes five ALs, which are AL=1, AL=2, AL=4, AL=8, and AL=16, respectively. The maximum numbers of candidate channels for the five ALs are 1, 2, 3, 4, and 5, respectively. Further, aggregationLevel1 ENUMERATED {n0, n1} indicates that the numbers of candidate channels supportable by AL=1 are 0 and 1.

It is to be noted that when the numbers of receiving antennas included in the above UE are 1 and 2, the numbers of candidate channels for the USSs in the UEs are merely illustrative. The UE includes different numbers of receiving antennas. The maximum number of candidate channels for each AL in the USS may be set as actually required, which will not be limited to the example.

According to the method for determining a search space in the example of the disclosure, the maximum number of candidate channels for at least one AL in the USS is determined to be less than the maximum configured value. The maximum number of candidate channels for each AL in the USS is relevant to the number of receiving antennas included in the UE. Accordingly, by limiting the maximum number of candidate channels for at least one AL in the USS according to the number of receiving antennas included in the UE, the maximum number of blind detections of the UE is reduced, and the reduced maximum number of blind detections matches the performance of the UE. Consequently, the performance of the UE is better.

In order to further reduce the number of blind detections of downlink control information by the UE, in an example of the disclosure, the communication device may determine the maximum number of candidate channels for each AL in the USS by parsing the relevant protocol. The maximum number of candidate channels for at least one AL is less than the maximum configured value. The sum of the maximum numbers of candidate channels for all the ALs in the USS is relevant to the maximum number of blind detections corresponding to the UE.

For example, as a relevant mode, the sum of the maximum numbers of candidate channels for all the ALs in the USS may be less than or equal to the maximum number of blind detections corresponding to the UE.

For example, the maximum number of blind detections corresponding to the UE is 22. The maximum numbers of candidate channels for AL=1, AL=2, AL=4, AL=8, and AL=16 in the USS are determined as 2, 5, 3, 4, and 6, respectively. The sum of the maximum numbers of candidate channels for all the ALs in the USS is 2+5+3+4+6=20, which is less than the maximum number of blind detections (22).

Alternatively, as another relevant mode, the sum of the maximum numbers of candidate channels for all the ALs in the USS may also be equal to the sum of the maximum number of blind detections corresponding to the UE and N, where N is an integer.

For example, the maximum configured value is 8, the maximum number of blind detections corresponding to the UE is 22, and N=2. The maximum numbers of candidate channels for AL=1, AL=2, AL=4, AL=8, and AL=16 in the USS are determined as 4, 5, 3, 4, and 8, respectively. The sum of the maximum numbers of candidate channels for all the ALs in the USS is 4+5+3+4+8=22+2.

Alternatively, as yet another relevant mode, the maximum number of blind detections may be an integer multiple of the sum of the maximum numbers of candidate channels for all the ALs in the USS.

It is to be noted that other relevant modes may also be employed, which will not be limited to the example.

According to the method for determining a search space in the example of the disclosure, the maximum number of candidate channels for each AL in the USS is determined. The maximum number of candidate channels for at least one AL is less than the maximum configured value. The sum of the maximum numbers of candidate channels for all the ALs in the USS is relevant to the maximum number of blind detections corresponding to the UE. Accordingly, it can be further ensured that the number of blind detections of the UE is reduced by limiting the maximum number of candidate channels for at least one AL in the USS to be less than the maximum configured value, and limiting the sum of the maximum numbers of candidate channels for all the ALs in the USS to be relevant to the maximum number of blind detections corresponding to the UE. Consequently, the power consumption of the UE is reduced, and the power is saved.

In the related art, novel user equipment is provided and designed, so as to cover the requirements of a UE for the Internet of Things. Such a UE is referred to as a capability-limited UE, such as a reduced capability UE. When the capability-limited UE is applied to an Internet of Things service, it is also required to satisfy the requirement for saving power of the Internet of Things device.

In view of that, in an example of the disclosure, the communication device may determine the maximum number of candidate channels for each AL in a USS of the capability-limited UE by parsing a relevant protocol. The maximum number of candidate channels for at least one AL is less than the maximum configured value.

In the example, the maximum number of candidate channels for each AL in the USS of the capability-limited UE may be the same or not.

According to the method for determining a search space in the example of the disclosure, the maximum number of candidate channels for at least one AL in the USS of the capability-limited UE is determined to be less than the maximum configured value. Accordingly, the maximum number of blind detections of the capability-limited UE is reduced by limiting the maximum number of candidate channels for at least one AL in the USS of the capability-limited UE to be less than the maximum configured value. Consequently, the power consumption of the capability-limited UE is reduced, and the power is saved.

In an example of the disclosure, the maximum numbers of candidate channels for all or some of the ALs in the USS are determined to be different. The maximum number of candidate channels for at least one AL is less than the maximum configured value.

In the example, the maximum number of candidate channels for each AL in the USS is determined to be different, and the maximum number of candidate channels for at least one AL in the USS is less than the maximum configured value. Alternatively, the maximum number of candidate channels for some ALs in the USS is determined to be different, and the maximum number of candidate channels for at least one AL is less than the maximum configured value.

It is assumed that the maximum configured value is 8, and there are five ALs, which are AL=1, AL=2, AL=4, AL=8, and AL=16, respectively. For example, the maximum numbers of candidate channels for the five ALs are determined as 2, 4, 5, 6, and 8, respectively. The maximum number of candidate channels for each AL is different. For another example, the maximum numbers of candidate channels for the five ALs are determined as 2, 2, 5, 6, and 8, respectively. The maximum numbers of candidate channels for AL=4, AL=8, and AL=16 are different.

Alternatively, the maximum number of candidate channels for an AL, including a larger number of CCEs, in the USS may be greater than the maximum number of candidate channels for an AL including a smaller number of CCEs.

Since the number of CCEs included in the AL determines the AL, the greater the number of included CCEs is, the higher the AL is. That is, the maximum number of candidate channels for a higher AL in the USS may be greater than the maximum number of candidate channels for a lower AL, so as to enhance downlink coverage of the capability-limited UE.

It is assumed that the maximum configured value is 8, and there are five ALs, which are AL=1, AL=2, AL=4, AL=8, and AL=16, respectively. For example, the maximum numbers of candidate channels for the five ALs are determined to be different, which are 1, 2, 3, 4, and 5, respectively, and all are less than the maximum configured value. The following may be configured:

```
nrofCandidates
{   SEQUENCE
 aggregationLevel1       ENUMERATED {n0, n1},
 aggregationLevel2       ENUMERATED {n0, n1, n2},
 aggregationLevel4       ENUMERATED {n0, n1, n2, n3},
 aggregationLevel8       ENUMERATED {n0, n1, n2, n3, n4},
 aggregationLevel16      ENUMERATED {n0, n1, n2, n3, n4, n5}
}
```

According to the method for determining a search space in the example of the disclosure, the maximum numbers of candidate channels for some ALs in the USS are determined to be different. The maximum number of candidate channels for at least one AL is less than the maximum configured value. Accordingly, the maximum number of blind detections of the UE is reduced by limiting the maximum number of candidate channels for at least one AL in the USS. Consequently, the power consumption of the UE is reduced, and the power is saved.

In an example of the disclosure, the maximum numbers of candidate channels for all or some of the ALs in the USS are determined to be the same. The maximum number of candidate channels for at least one AL is less than the maximum configured value.

In the example, the maximum numbers of candidate channels for all the ALs in the USS are the same. The maximum number of candidate channels for each AL is less than the maximum configured value. That is, each AL is configured with the same maximum number of candidate channels, and the maximum number of candidate channels is less than the maximum configured value. Alternatively, the maximum numbers of candidate channels for some ALs in the USS are the same. The maximum number of candidate channels for at least one AL in the USS is less than the maximum configured value. The maximum numbers of candidate channels for some ALs are the same. The maximum numbers of candidate channels for these ALs may be less than or equal to the maximum configured value.

For example, the maximum configured value is 8, and it is determined that there are five ALs in the USS, which are AL=1, AL=2, AL=4, AL=8, and AL=16, respectively. For example, the maximum numbers of candidate channels for the five ALs are 4. Alternatively, the maximum number of candidate channels for AL=1 and AL=2 is 1, and the maximum number of candidate channels for AL=4, AL=8, and AL=16 is 3.

In response to determining that the maximum number of candidate channels for each AL is 4, the following may be specified:

```
nrofCandidates
SEQUENCE {
 aggregationLevel1       ENUMERATED {n0, n1, n2, n3, n4},
 aggregationLevel2       ENUMERATED {n0, n1, n2, n3, n4},
 aggregationLevel4       ENUMERATED {n0, n1, n2, n3, n4},
 aggregationLevel8       ENUMERATED {n0, n1, n2, n3, n4},
 aggregationLevel16      ENUMERATED {n0, n1, n2, n3, n4}
}
```

Alternatively, the maximum configured value is 8, and it is determined that there are five ALs in the USS, which are AL=1, AL=2, AL=4, AL=8, and AL=16, respectively. The maximum number of candidate channels for AL=1 and AL=2 is 1, the maximum number of candidate channels for AL=4 is 3, and the maximum number of candidate channels for AL=8 and AL=16 is 8.

Thus, in view of the above, the following may be specified:

```
nrofCandidates
SEQUENCE {
aggregationLevel1      ENUMERATED {n0, n1},
aggregationLevel2      ENUMERATED {n0, n1},
aggregationLevel4      ENUMERATED {n0, n1, n2, n3},
aggregationLevel8      ENUMERATED {n0, n1, n2, n3, n4, n5, n6, n8},
aggregationLevel16     ENUMERATED {n0, n1, n2, n3, n4, n5, n6, n8}
}
```

It is to be noted that the same maximum number of candidate channels for all or some of the ALs in the USS may be set as actually required, which will not be limited to the example of the disclosure.

According to the method for determining a search space in the example of the disclosure, the maximum numbers of candidate channels for all or some of the ALs in the USS are determined to be the same. The maximum number of candidate channels for at least one AL is less than the maximum configured value. Accordingly, the maximum number of blind detections of the UE is reduced by limiting the maximum number of candidate channels for at least one AL in the USS. Consequently, the power consumption of the UE is reduced, and the power is saved.

In consideration of coverage enhancement, in an example of the disclosure, the number of CCEs included in an AL, having the maximum number of candidate channels supported less than the maximum configured value, in the USS is determined to be smaller than a first threshold.

The first threshold is less than or equal to the maximum number of CCEs included in the AL in the USS. For example, if the first threshold is 4, the ALs, having the maximum number of candidate channels supported less than the maximum configured value, in the USS are AL=1, AL=2, and AL=4. That is, the maximum numbers of candidate channels for the three ALs of AL=1, AL=2, and AL=4 in the USS are less than the maximum configured value.

Since the number of CCEs included in the AL determines the AL, the greater the number of included CCEs is, the higher the AL is. In the example, the maximum number of candidate channels for the AL having the number of included CCEs less than the first threshold is less than the maximum configured value. That is, the maximum number of candidate channels for a lower AL is less than the maximum configured value.

Further, the maximum numbers of candidate channels for the ALs having the number of included CCEs less than the first threshold may be different and less than the maximum configured value. In the example, the maximum numbers of candidate channels for all ALs having the numbers of included CCEs less than the first threshold may be different in all or in part.

For example, the maximum numbers of candidate channels for some ALs having the numbers of included CCEs less than 16 may be different. For example, the following may be specified:

```
nrofCandidates
SEQUENCE {
aggregationLevel1      ENUMERATED {n0, n1},
aggregationLevel2      ENUMERATED {n0, n1},
aggregationLevel4      ENUMERATED {n0, n1, n2},
aggregationLevel8      ENUMERATED {n0, n1, n2, n3},
aggregationLevel16     ENUMERATED {n0, n1, n2, n3, n4, n5, n6, n8}
}
```

Alternatively, the maximum number of candidate channels for a lower AL among the ALs having the number of included CCEs less than the first threshold is less than the maximum number of candidate channels for a higher AL.

For example, the following is specified:

```
nrofCandidates
SEQUENCE {
aggregationLevel1      ENUMERATED {n0, n1},
aggregationLevel2      ENUMERATED {n0, n1, n2},
aggregationLevel4      ENUMERATED {n0, n1, n2, n3},
aggregationLevel8      ENUMERATED {n0, n1, n2, n3, n4},
aggregationLevel16     ENUMERATED {n0, n1, n2, n3, n4, n5, n6, n8}
}
```

Alternatively, the maximum numbers of candidate channels for the ALs having the numbers of included CCEs less than the first threshold are the same. Alternatively, the maximum numbers of candidate channels for some lower ALs are the same and less than the maximum configured value.

For example, the following may be specified:

```
nrofCandidates
SEQUENCE {
aggregationLevel1      ENUMERATED {n0, n1},
aggregationLevel2      ENUMERATED {n0, n1},
aggregationLevel4      ENUMERATED {n0, n1},
aggregationLevel8      ENUMERATED {n0, n1},
aggregationLevel16     ENUMERATED {n0, n1, n2, n3, n4, n5, n6, n8}
}
```

According to the method for determining a search space in the example of the disclosure, the maximum number of blind detections of the UE is reduced by limiting the maximum number of candidate channels for a lower AL in the USS. Consequently, the power consumption of the UE is reduced, the power is saved, and the coverage is enhanced.

In consideration of the coverage enhancement and the possibility that the capability-limited UE does not support certain lower ALs or supports higher ALs, in an example of the disclosure, the maximum number of candidate channels for each AL in the USS of the capability-limited UE is determined. The maximum number of candidate channels for at least one AL is less than the maximum configured value. A lower limit of CCEs included in the AL in the USS of the capability-limited UE is greater than a second threshold, and/or an upper limit of CCEs included in the AL in the USS is less than or equal to a third threshold. The second threshold is less than the third threshold.

Considering that the capability-limited UE does not support a lower AL, in an example, the lower limit of CCEs included in the AL in the USS is greater than the second threshold, and the USS is restricted from including a lower AL by limiting the lower limit of the CCEs included in the USS.

For example, if the second threshold is 1, the lower limit is 2, and the USS does not include a lower AL=1. It is to be noted that the second threshold of 1 is merely illustrative, and the second threshold and the lower limit may be set as actually required, which will not be limited to the example.

In response to determining that the lower limit of the CCEs included in the AL in the USS is greater than the second threshold, the maximum number of candidate channels for each AL in the USS may be determined. The maximum number of candidate channels for at least one AL is less than the maximum configured value. In the example, any embodiment in each example of the disclosure may be employed separately, which will not be limited or repeated in the example of the disclosure.

The lower limit of 2 is taken as an example. That is, the case where the capability-limited UE does not support AL=1 is taken as an example:

Mode 1: the maximum numbers of candidate channels for all the ALs in the USS are the same and less than the maximum configured value. For example, the maximum number of candidate channels for each AL is 5, and AL=1 is unsupported. The following may be specified:

```
nrofCandidates
{SEQUENCE
aggregationLevel2      ENUMERATED {n0, n1, n2, n3, n4, n5}
aggregationLevel4      ENUMERATED {n0, n1, n2, n3, n4, n5}
aggregationLevel8      ENUMERATED {n0, n1, n2, n3, n4, n5}
aggregationLevel16     ENUMERATED {n0, n1, n2, n3, n4, n5}
}
```

Mode 2: the maximum numbers of candidate channels for the ALs having the number of included CCEs less than the first threshold are the same and less than the maximum configured value. For example, the following is specified:

```
nrofCandidates
{SEQUENCE
aggregationLevel2      ENUMERATED {n0, n1, n2, n3, n4, n5}
aggregationLevel4      ENUMERATED {n0, n1, n2, n3, n4, n5}
aggregationLevel8      ENUMERATED {n0, n1, n2, n3, n4, n5}
aggregationLevel16     ENUMERATED {n0, n1, n2, n3, n4, n5, n6, n8},
}
```

Mode 3: the maximum numbers of candidate channels for all the ALs in the USS are different and less than the maximum configured value. For example, the following may be specified:

```
nrofCandidates
SEQUENCE {
aggregationLevel2      ENUMERATED {n0, n1, n2,},
aggregationLevel4      ENUMERATED {n0, n1, n2, n3},
aggregationLevel8      ENUMERATED {n0, n1, n2, n3, n4},
aggregationLevel16     ENUMERATED {n0, n1, n2, n3, n4, n5, n6}
}
```

Alternatively, the maximum numbers of candidate channels for the ALs having the numbers of included CCEs less than the first threshold are less than the maximum configured value. For example, the following may be specified:

```
nrofCandidates
SEQUENCE {
aggregationLevel2      ENUMERATED {n0, n1, n2,},
aggregationLevel4      ENUMERATED {n0, n1, n2, n3},
```

-continued

```
aggregationLevel8      ENUMERATED {n0, n1, n2, n3, n4},
aggregationLevel16     ENUMERATED {n0, n1, n2, n3, n4, n5, n6, n8}
}
```

Considering that the capability-limited UE may support a higher AL, in an example, the upper limit of the CCEs included in the AL in the USS is less than or equal to the third threshold. A higher aggregation level (AL) is introduced for the capability-limited device by limiting the upper limit of the CCEs included in the USS.

In response to determining that the upper limit of the CCEs included in the AL in the USS is less than or equal to the third threshold, the maximum number of candidate channels for each AL in the USS of the capability-limited UE is determined. The maximum number of candidate channels for at least one AL is less than the maximum configured value. In the example, the maximum number of candidate channels for each AL in the USS of the capability-limited UE may be determined by employing any embodiment in each example of the disclosure separately, which will not be limited or repeated in the example of the disclosure.

For example, if the third threshold is 32, and the upper limit is 32, a higher AL=32 is introduced for the USS of the capability-limited UE. It is to be noted that the third threshold and the upper limit of 32 are merely illustrative and may be set as actually required, which will not be limited to the example.

The upper limit of 32 is taken as an example. That is, the case where AL=32 is introduced for the capability-limited UE is taken as an example:

Mode 1: the maximum numbers of candidate channels for all the ALs in the USS are the same and less than the maximum configured value. For example, the maximum number of candidate channels for each AL is 3, and AL=32 is not supported. The following may be specified:

```
nrofCandidates
SEQUENCE {
aggregationLevel1      ENUMERATED {n0, n1, n2, n3},
aggregationLevel2      ENUMERATED {n0, n1, n2, n3},
aggregationLevel4      ENUMERATED {n0, n1, n2, n3},
aggregationLevel8      ENUMERATED {n0, n1, n2, n3},
aggregationLevel16     ENUMERATED {n0, n1, n2, n3},
aggregationLevel32     ENUMERATED {n0, n1, n2, n3}
}
```

Mode 2: the maximum numbers of candidate channels for all the ALs in the USS are different and less than the maximum configured value. For example, the following may be specified:

```
nrofCandidates
SEQUENCE {
aggregationLevel1      ENUMERATED {n0, n1},
aggregationLevel2      ENUMERATED {n0, n1},
aggregationLevel4      ENUMERATED {n0, n1, n2},
aggregationLevel8      ENUMERATED {n0, n1, n2, n3},
aggregationLevel16     ENUMERATED {n0, n1, n2, n3, n4},
aggregationLevel32     ENUMERATED {n0, n1, n2, n3, n4, n5}
}
```

Mode 3: the maximum numbers of candidate channels for the ALs having the numbers of included CCEs less than the first threshold are the same and less than the maximum configured value. For example, the following may be specified:

```
nrofCandidates
SEQUENCE {
aggregationLevel1      ENUMERATED {n0, n1, n2},
aggregationLevel2      ENUMERATED {n0, n1, n2},
aggregationLevel4      ENUMERATED {n0, n1, n2},
aggregationLevel8      ENUMERATED {n0, n1, n2},
aggregationLevel16     ENUMERATED {n0, n1, n2},
aggregationLevel32     ENUMERATED {n0, n1, n2, n3, n4, n5, n6, n8}
}
```

Alternatively, the maximum numbers of candidate channels for the ALs having the numbers of included CCEs less than the first threshold are partially the same and less than the maximum configured value. For example, the following may be specified:

```
nrofCandidates
SEQUENCE {
aggregationLevel1      ENUMERATED {n0, n1},
aggregationLevel2      ENUMERATED {n0, n1, n2},
aggregationLevel4      ENUMERATED {n0, n1, n2},
aggregationLevel8      ENUMERATED {n0, n1, n2, n3},
aggregationLevel16     ENUMERATED {n0, n1, n2, n3, n4},
aggregationLevel32     ENUMERATED {n0, n1, n2, n3, n4, n5, n6, n8}
}
```

Considering that the capability-limited UE does not support a lower AL and supports a higher AL, in an example, the lower limit of the CCEs included in the AL in the USS is greater than the second threshold, and the upper limit of the CCEs included in the AL in the USS is less than or equal to the third threshold. In the example, any embodiment in each example of the disclosure may be employed separately, which will not be limited or repeated in the example of the disclosure.

The lower limit of the CCEs of 2 and the upper limit of the CCEs of 32 are taken as an example. That is, the case that AL=32 is introduced for the capability-limited UE and AL=1 is not supported is taken as an example:

Mode 1: the maximum numbers of candidate channels for all the ALs in the USS are the same and less than the maximum configured value. For example, the maximum number of candidate channels for each AL is 4, AL=32 is supported, and AL=1 is not supported. The following may be specified:

```
    nrofCandidates
    SEQUENCE {
    aggregationLevel2      ENUMERATED {n0, n1, n2, n3, n4},
    aggregationLevel4      ENUMERATED {n0, n1, n2, n3, n4},
    aggregationLevel8      ENUMERATED {n0, n1, n2, n3, n4},
    aggregationLevel16     ENUMERATED {n0, n1, n2, n3, n4},
    aggregationLevel32     ENUMERATED {n0, n1, n2, n3, n4}
    }
```

Mode 2: the maximum numbers of candidate channels for all the ALs in the USS are different and less than the maximum configured value. For example, the following may be specified:

```
nrofCandidates
SEQUENCE {
```

-continued

```
aggregationLevel2      ENUMERATED {n0, n1},
aggregationLevel4      ENUMERATED {n0, n1, n2},
aggregationLevel8      ENUMERATED {n0, n1, n2, n3},
aggregationLevel16     ENUMERATED {n0, n1, n2, n3, n4, n5},
aggregationLevel32     ENUMERATED {n0, n1, n2, n3, n4, n5, n6}
}
```

Mode 3: the maximum numbers of candidate channels for the ALs having the numbers of included CCEs less than the first threshold are the same and less than the maximum configured value. For example, the following may be specified:

```
nrofCandidates
SEQUENCE {
aggregationLevel2      ENUMERATED {n0, n1, n2},
aggregationLevel4      ENUMERATED {n0, n1, n2},
aggregationLevel8      ENUMERATED {n0, n1, n2},
aggregationLevel16     ENUMERATED {n0, n1, n2},
aggregationLevel32     ENUMERATED {n0, n1, n2, n3, n4, n5, n6, n8}
}
```

Alternatively, the maximum numbers of candidate channels for the ALs having the numbers of included CCEs less than the first threshold are partially the same and less than the maximum configured value. For example, the following may be specified:

```
nrofCandidates
SEQUENCE {
aggregationLevel2      ENUMERATED {n0, n1, n2},
aggregationLevel4      ENUMERATED {n0, n1, n2},
aggregationLevel8      ENUMERATED {n0, n1, n2, n3},
aggregationLevel16     ENUMERATED {n0, n1, n2, n3, n4},
aggregationLevel32     ENUMERATED {n0, n1, n2, n3, n4, n5, n6, n8}
}
```

According to the method for determining a search space in the example of the disclosure, the maximum number of candidate channels for the AL in the USS is limited by limiting the lower limit and/or upper limit of the CCEs included in the AL in the USS of the capability-limited UE. Consequently, the maximum number of blind detections of the capability-limited UE is reduced, the power consumption of the capability-limited UE is reduced, the power is saved, and the coverage is enhanced.

The disclosure further provides an apparatus for determining a search space, which corresponds to the method for determining a search space according to the several above examples. Since the apparatus for determining a search space according to the example of the disclosure corresponds to the method for determining a search space according to the several above examples, the embodiment of the method for determining a search space is also applicable to the apparatus for determining a search space according to the example, which will not be described in detail in the example. FIG. 2 is a schematic structural diagram of an apparatus 200 for determining a search space according to an example of the disclosure.

As shown in FIG. 2, the apparatus 200 for determining a search space may include: a determination module 210.

The determination module 210 is configured to determine a maximum number of candidate channels for each AL in a USS. The maximum number of candidate channels for at least one AL is less than a maximum configured value.

Alternatively, the determination module 210 is configured to determine the maximum number of candidate channels for each AL in the USS. The maximum number of candidate channels for at least one AL is less than the maximum configured value. The maximum number of candidate channels for each AL in the USS is relevant to the number of receiving antennas included in the UE.

Alternatively, the determination module 210 is configured to determine the maximum number of candidate channels for each AL in the USS. The maximum number of candidate channels for at least one AL is less than the maximum configured value. The sum of the maximum numbers of candidate channels for all the ALs in the USS is relevant to the maximum number of blind detections corresponding to the UE.

Alternatively, the UE is a capability-limited UE. The determination module 210 is configured to determine the maximum number of candidate channels for each AL in a USS of the capability-limited UE. The maximum number of candidate channels for at least one AL is less than the maximum configured value.

Alternatively, the determination module 210 is configured to determine that the maximum numbers of candidate channels for all or some of the ALs in the USS are different. The maximum number of candidate channels for at least one AL in the USS is less than the maximum configured value.

Alternatively, the maximum number of candidate channels for an AL, including a larger number of control channel elements (CCEs), in the USS is greater than the maximum number of candidate channels for an AL including a smaller number of CCEs.

Alternatively, the determination module 210 is configured to determine that the maximum numbers of candidate channels for all or some of the ALs in the USS are the same. The maximum number of candidate channels for at least one AL is less than the maximum configured value.

Alternatively, the determination module 210 is configured to determine that the number of CCEs included in an AL, having the maximum number of candidate channels supported less than the maximum configured value, in the USS is less than a first threshold.

Alternatively, the determination module 210 is configured to determine the maximum number of candidate channels for each AL in the USS of the capability-limited UE. The maximum number of candidate channels for at least one AL is less than the maximum configured value. A lower limit of CCEs included in the AL in the USS of the capability-limited UE is greater than a second threshold, and/or an upper limit of CCEs included in the AL in the USS is less than or equal to a third threshold. The second threshold is less than the third threshold.

According to the apparatus for determining a search space in the example of the disclosure, the maximum number of blind detections of the UE is reduced by limiting the maximum number of candidate channels for at least one AL in the USS. Consequently, the power consumption of the UE is reduced, and the power is saved.

According to an example of the disclosure, a communication device and a readable storage medium are further provided in the disclosure.

FIG. 3 is a schematic structural diagram of a communication device according to an example of the disclosure. The communication device is intended to denote various forms of digital computers, such as laptop computers, desktop computers, workstations, personal digital assistants, servers, blade servers, mainframe computers, and other suitable computers. The communication device may also denote various forms of mobile apparatuses, such as personal digital processing apparatuses, cell phones, smart phones, wearable devices, and other similar computation apparatuses. The components illustrated here, their connections and relations, and their functions are merely illustrative and are not intended to limit the implementation of the disclosure as described and/or claimed here.

As shown in FIG. 3, the communication device includes: one or more processors 810, a memory 820, and interfaces configured to be connected to all components, including a high-speed and low-speed interface. All the components are interconnected through different buses and may be mounted on a common motherboard or in other manners as required. The processor 810 may process an instruction executed in the communication device, including an instruction stored in or on the memory 820 to display graphical information of a graphical user interface (GUI) on an external input/output apparatus (such as a display device coupled to the interface). In other embodiments, a plurality of processors 810 and/or buses may be used, as required, along with a plurality of memories. Similarly, a plurality of communication devices may be connected, and each device provides some necessary operations (for example, as a server array, a blade server set, or a multiprocessor system). One processor 810 is illustrated in FIG. 3.

The memory 820 is a non-transitory computer-readable storage medium provided by the disclosure. The memory 820 stores an instruction executable by at least one processor 810 to cause the at least one processor 810 to execute the method for determining a search space provided by the disclosure. The non-transitory computer-readable storage medium of the disclosure stores a computer instruction configured to cause a computer to execute the method for determining a search space provided by the disclosure.

The memory 820, as a non-transitory computer-readable storage medium, may be configured to store a non-transitory software program, a non-transitory computer-executable program, and a module, for example, a program instruction/module corresponding to the method for determining a search space in the example of the disclosure (for example, the determination module 210 shown in FIG. 2). The processor 810 executes various function applications and data processing of the server, that is, implements the method for determining a search space in the above method example, by running the non-transitory software program, instruction, and module stored in the memory 820.

The memory 820 may include a program storage area and a data storage area. The program storage area may store an operation system and an application required by at least one function. The data storage area may store data constructed according to the use of a positioning communication device, etc. In addition, the memory 820 may include a high-speed random access memory, and a non-transitory memory, such as at least one magnetic disk storage device, a flash memory device, or other non-transitory solid-state storage devices. Alternatively, the memory 820 may include memories remotely configured relative to the processor 810. These remote memories may be connected to the positioning communication device through a network. Instances of the above network include, but are not limited to, the Internet, an intranet, a local area network, a mobile communication network, and their combinations.

The communication device for determining a search space may further include: an input apparatus 830 and an output apparatus 840. The processor 810, the memory 820, the input apparatus 830, and the output apparatus 840 may be connected through a bus, etc. In FIG. 3, they are connected through a bus as an example.

The input apparatus 830 may receive input digital or character information and generate a key signal input relevant to user settings and function control of the positioning communication device. The input apparatus may be a touch screen, a keypad, a mouse, a track pad, a touch pad, a pointing stick, one or more mouse buttons, a track ball, a joystick, etc. The output apparatus 840 may include a display device, an auxiliary lighting device (for example, a light emitting diode (LED)), a tactile feedback apparatus (for example, a vibration electric motor), etc. The display devices may include, but are not limited to, a liquid crystal display (LCD), an LED display, and a plasma display. In some embodiments, the display device may be a touch screen.

Various embodiments of the system and technology described here can be implemented in a digital electronic circuit system, an integrated circuit system, an application-specific integrated circuit (ASIC), computer hardware, firmware, software, and/or their combinations. These various embodiments can include: implementation in one or more computer programs executable and/or interpretable on a programmable system including at least one programmable processor. The programmable processor can be a special-purpose or general-purpose programmable processor that can receive data and instructions from a storage system, at least one input apparatus, and at least one output apparatus, and transmit the data and instructions to the storage system, the at least one input apparatus, and the at least one output apparatus.

These computation programs (also referred to as programs, software, software applications, or codes) include a machine instruction for the programmable processor, and can be implemented in a high-level procedural and/or object-oriented programming language, and/or assembly/machine language. As used here, the terms "machine-readable medium" and "computer-readable medium" refer to any computer program product, device, and/or apparatus (for example, a magnetic disk, an optical disk, a memory, and a programmable logic device (PLD)) configured to provide a machine instruction and/or data to the programmable processor, including a machine-readable medium that receives a machine instruction as a machine-readable signal. The term "machine-readable signal" refers to any signal configured to provide a machine instruction and/or data to the programmable processor.

In order to provide an interaction with a user, the system and technology described here can be implemented on a computer. The computer is provided with a display apparatus (for example, a cathode ray tube (CRT) monitor or a liquid crystal display (LCD) monitor) for displaying information to the user, and a keyboard and a pointing apparatus (for example, a mouse or a track ball) through which the user can provide input for the computer. Other types of apparatuses can also be configured to provide an interaction with a user. For example, feedback provided for the user can be in any form of sensory feedback (for example, visual feedback, auditory feedback, or tactile feedback). An input from the user can be received in any form (including an acoustic input, a voice input, or a tactile input).

The system and technology described here can be implemented on a computation system (for example, as a data server) that includes a background component, a computation system (for example, an application server) that includes a middleware component, a computation system (for example, a user computer having a graphical user interface or a web browser through which the user can interact with the embodiments of the system and technology described here) that includes a front-end component, or a computation system that includes any combination of the background component, the middleware component, or the front-end component. The components of the system can be interconnected through digital data communication (for example, a communication network) in any form or through any medium. Instances of the communication network include: a local area network (LAN), a wide area network (WAN), and the Internet.

The computer system can include a client and a server. Typically, the client and the server are away from each other and interact mutually through the communication network. The relation between the client and the server is generated through computer programs running on corresponding computers and being in a client-server relation.

According to the communication device in the example of the disclosure, the maximum number of candidate channels for at least one AL in the USS is determined to be less than the maximum configured value, so as to reduce the maximum number of blind detections of the UE. Consequently, the power consumption of the UE is reduced, and the power is saved.

It should be understood that various forms of the flows shown above can be used, with steps re-ranked, added, or deleted. For example, various steps described in the disclosure can be executed in parallel, in sequence, or in different orders, as long as the desired results of the technical solutions disclosed in the disclosure can be realized, which will not be limited here.

The above particular embodiments are not intended to limit the scope of protection of the disclosure. Those skilled in the art should understand that various modifications, combinations, sub-combinations, and substitutions can be made according to the design requirements and other factors. Any modifications, equivalent replacements, improvements, and the like, made within the spirit and the principles of the disclosure should fall within the scope of protection of the disclosure.

What is claimed is:

1. A method for determining a search space, comprising:
determining a maximum number of candidate channels for each aggregation level (AL) in a user equipment (UE)-specific search space (USS), wherein the maximum number of candidate channels for at least one AL is less than a maximum configured value, maximum numbers of candidate channels for all or some of the ALs in the USS are different, and the maximum number of candidate channels for an AL comprising a larger number of control channel elements (CCEs) in the USS is greater than the maximum number of candidate channels for an AL comprising a smaller number of CCEs.

2. The method according to claim 1, wherein the maximum number of candidate channels for each AL in the USS is determined based on a number of receiving antennas comprised in the UE.

3. The method according to claim 1, wherein a sum of the maximum numbers of candidate channels for all the ALs in the USS is determined based on a maximum number of blind detections corresponding to the UE.

4. The method according to claim 1, wherein the UE is a capability-limited UE.

5. The method according to claim 1, wherein the maximum numbers of candidate channels for all or some of the ALs in the USS are the same.

6. The method according to claim 1, wherein a number of control channel elements (CCEs) comprised in an AL, having the maximum number of candidate channels less than the maximum configured value, in the USS is less than a first threshold.

7. The method according to claim 1, wherein the UE is a capability-limited UE, and a lower limit of control channel elements (CCEs) comprised in the AL in the USS is greater than a second threshold;

and, an upper limit of CCEs comprised in the AL in the USS is less than or equal to a third threshold, wherein the second threshold is less than the third threshold.

8. A communication device, comprising: a transceiver; a memory; and a processor, which is connected to the transceiver and the memory separately and configured to control the transceiver to receive and transmit a radio signal by executing a computer-executable instruction in the memory, and the processor is caused to:

determine a maximum number of candidate channels for each aggregation level (AL) in a user equipment (UE)-specific search space (USS), wherein the maximum number of candidate channels for at least one AL is less than a maximum configured value, maximum numbers of candidate channels for all or some of the ALs in the USS are different, and the maximum number of candidate channels for an AL comprising a larger number of control channel elements (CCEs) in the USS is greater than the maximum number of candidate channels for an AL comprising a smaller number of CCEs.

9. A non-transitory computer storage medium, storing a computer-executable instruction, wherein when the computer-executable instruction is executed by a processor, the processor is caused to perform a method comprising:

determining a maximum number of candidate channels for each aggregation level (AL) in a user equipment (UE)-specific search space (USS), wherein the maximum number of candidate channels for at least one AL is less than a maximum configured value, maximum numbers of candidate channels for all or some of the ALs in the USS are different, and the maximum number of candidate channels for an AL comprising a larger number of control channel elements (CCEs) in the USS is greater than the maximum number of candidate channels for an AL comprising a smaller number of CCEs.

10. The method according to claim 1, wherein the UE is a capability-limited UE, and a lower limit of control channel elements (CCEs) comprised in the AL in the USS is greater than a second threshold;

or, an upper limit of CCEs comprised in the AL in the USS is less than or equal to a third threshold, wherein the second threshold is less than the third threshold.

11. The communication device according to claim 8, wherein the maximum number of candidate channels for each AL in the USS is determined based on a number of receiving antennas comprised in the UE.

12. The communication device according to claim 8, wherein a sum of the maximum numbers of channels for all the ALs in the USS is determined based on a maximum number of blind detections corresponding to the UE.

13. The communication device according to claim 8, wherein the UE is a capability-limited UE.

14. The communication device according to claim 8, wherein the maximum numbers of candidate channel for all or some of the ALs in the USS are the same.

15. The communication device according to claim 8, wherein a number of CCEs comprised in an AL, having the maximum number of candidate channels less than the maximum configured value, in the USS is less than a first threshold.

16. The communication device according to claim 8, wherein the UE is a capability-limited UE, and a lower limit of control channel elements (CCEs) comprised in the AL in the USS is greater than a second threshold;

and/or, an upper limit of CCEs comprised in the AL in the USS is less than or equal to a third threshold, wherein the second threshold is less than the third threshold.

17. The method according to claim 1, wherein the maximum configured value is a maximum among maximum numbers of candidate channels for at least one AL specified in a protocol.

18. The method according to claim 3, the sum of the maximum numbers of candidate channels for all the ALs in the USS is less than or equal to the maximum number of blind detections corresponding to the UE.

19. The method according to claim 3, the maximum number of blind detections is an integer multiple of the sum of the maximum numbers of candidate channels for all the ALs in the USS.

20. The method according to claim 2, wherein the maximum number of candidate channels for each AL in the USS of different UEs is different, and different UEs comprise different numbers of receiving antennas.

\* \* \* \* \*